United States Patent [19]
Itoh et al.

[11] Patent Number: 5,518,976
[45] Date of Patent: May 21, 1996

[54] CATALYST FOR PURIFYING EXHAUST GAS AND METHOD FOR PURIFYING EXHAUST GAS

[75] Inventors: Takashi Itoh, Ichikawa; Katsumi Kurabayashi, Numazu; Hiroyuki Yamaguchi, Matudo, all of Japan

[73] Assignee: N. E. Chemcat Corporation, Tokyo, Japan

[21] Appl. No.: 273,430

[22] Filed: Jul. 11, 1994

[30] Foreign Application Priority Data

Jul. 9, 1993 [JP] Japan ................. 5-194260

[51] Int. Cl.⁶ .......................... B01J 29/064; C01B 39/06
[52] U.S. Cl. ................. 502/66; 502/71; 502/74; 502/77; 423/713
[58] Field of Search ............... 502/66, 71, 74, 502/77; 423/713, 714, 715

[56] References Cited

U.S. PATENT DOCUMENTS

| | | | |
|---|---|---|---|
| 3,878,125 | 4/1975 | Mitsche et al. | 502/73 |
| 4,576,805 | 3/1986 | Chang et al. | 423/DIG. 22 |
| 4,622,308 | 11/1986 | Koikeda et al. | 502/74 |
| 5,106,802 | 4/1992 | Horiuchi et al. | 502/65 |
| 5,141,908 | 8/1992 | Rao et al. | 502/66 |
| 5,154,902 | 10/1992 | Inui et al. | 423/239.2 |
| 5,164,350 | 11/1992 | Abe et al. | 502/74 |
| 5,223,236 | 6/1993 | Inoue et al. | 502/71 |
| 5,338,715 | 8/1994 | Iida et al. | 502/66 |
| 5,409,671 | 4/1995 | Takemoto et al. | 502/71 |
| 5,413,976 | 5/1995 | Takami et al. | 502/66 |

FOREIGN PATENT DOCUMENTS

| | | | |
|---|---|---|---|
| 0373665 | 6/1990 | European Pat. Off. | |
| 0485180 | 5/1992 | European Pat. Off. | |
| 0112612 | 6/1985 | Japan | 502/74 |
| 4040238 | 2/1992 | Japan | |
| 5076770 | 3/1993 | Japan | 502/74 |
| 9400223 | 9/1994 | WIPO | |

OTHER PUBLICATIONS

*Grant & Hackh's Chemical Dictionary*, 1987 p. 457 No Month.
Mitsubishi Heavy Ind., Patent Abstracts of Japan, vol. 16, No. 1 (C-0899) 7 Jan. 1992 JP-A-03 229 620.

*Primary Examiner*—Mark L. Bell
*Assistant Examiner*—David Sample
*Attorney, Agent, or Firm*—Wenderoth, Lind & Ponack

[57] ABSTRACT

A catalyst for purifying exhaust gas comprising crystalline iridium silicate having a Si/Ir atomic ratio of 50 to 800 and a Si/Al atomic ratio of not less than 15. The catalyst exhibits excellent activity and selectivity when used for purification of, and specifically for eliminating NOx from, an exhaust gas which contains reducing components including hydrocarbons, oxygen in excess of the stoichiometric quantity necessary for completely oxidizing all of the reducing components, and nitrogen oxides. The catalyst is highly durable to hydrothermal aging.

6 Claims, 3 Drawing Sheets

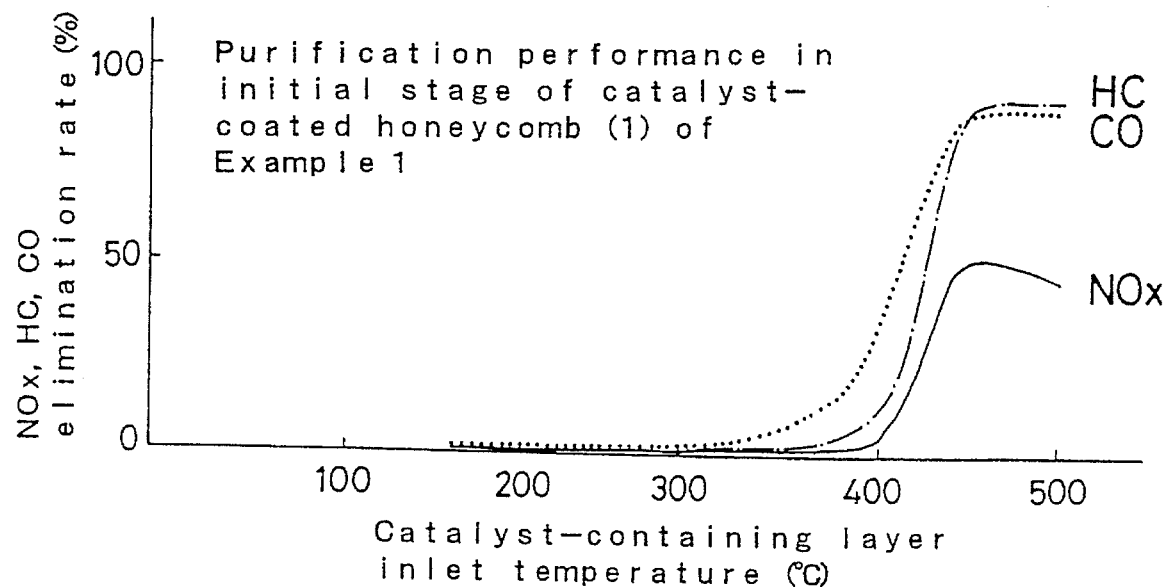
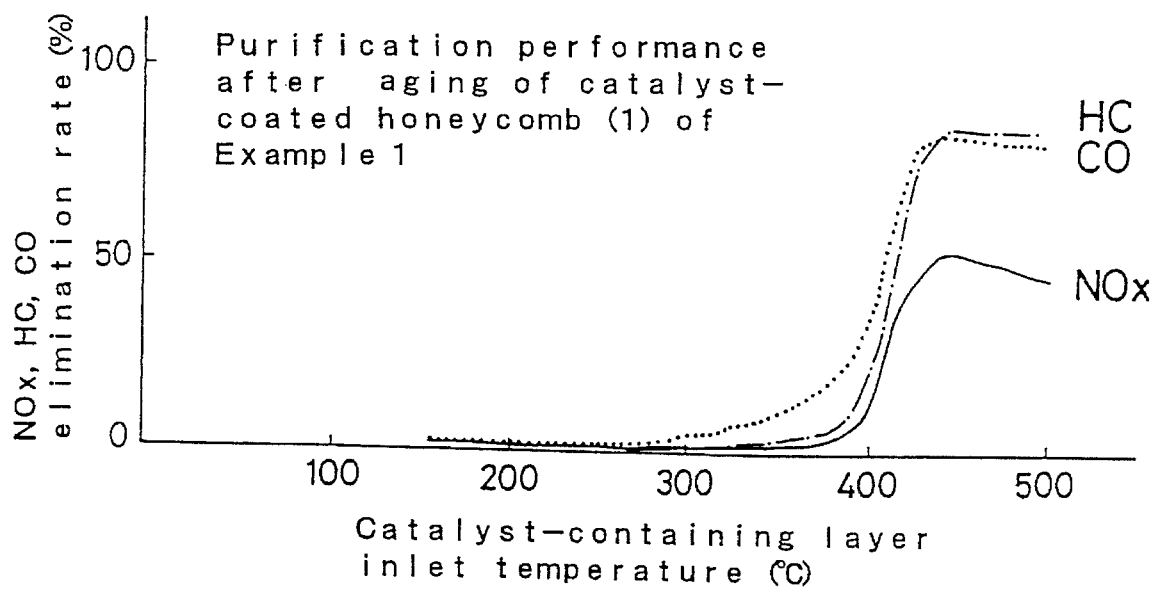

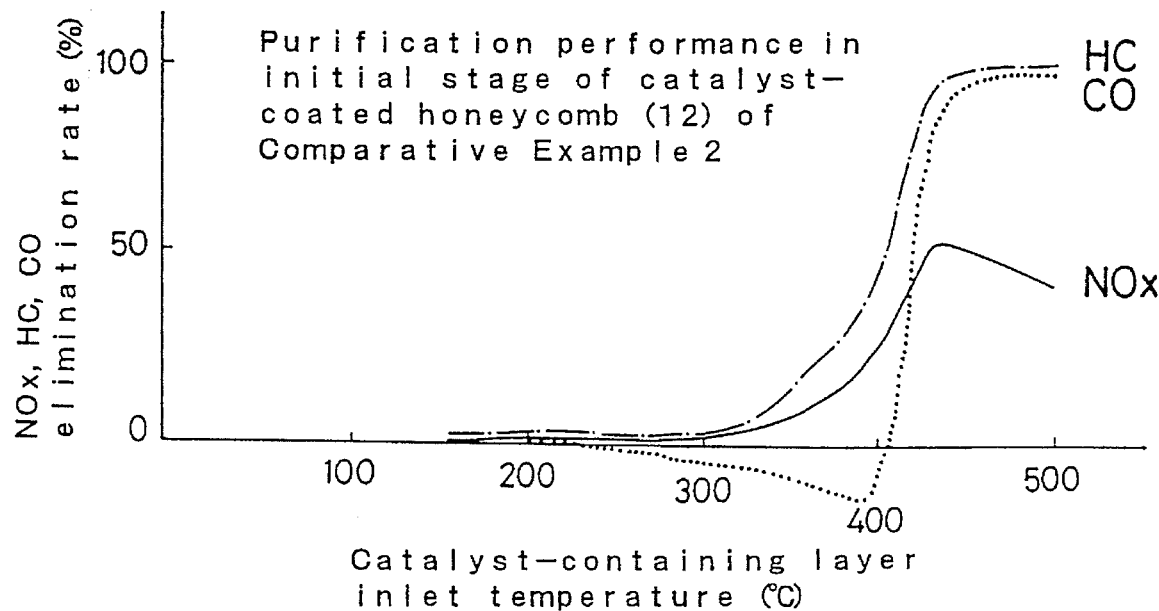
Fig. 3 Purification performance in initial stage of catalyst-coated honeycomb (12) of Comparative Example 2
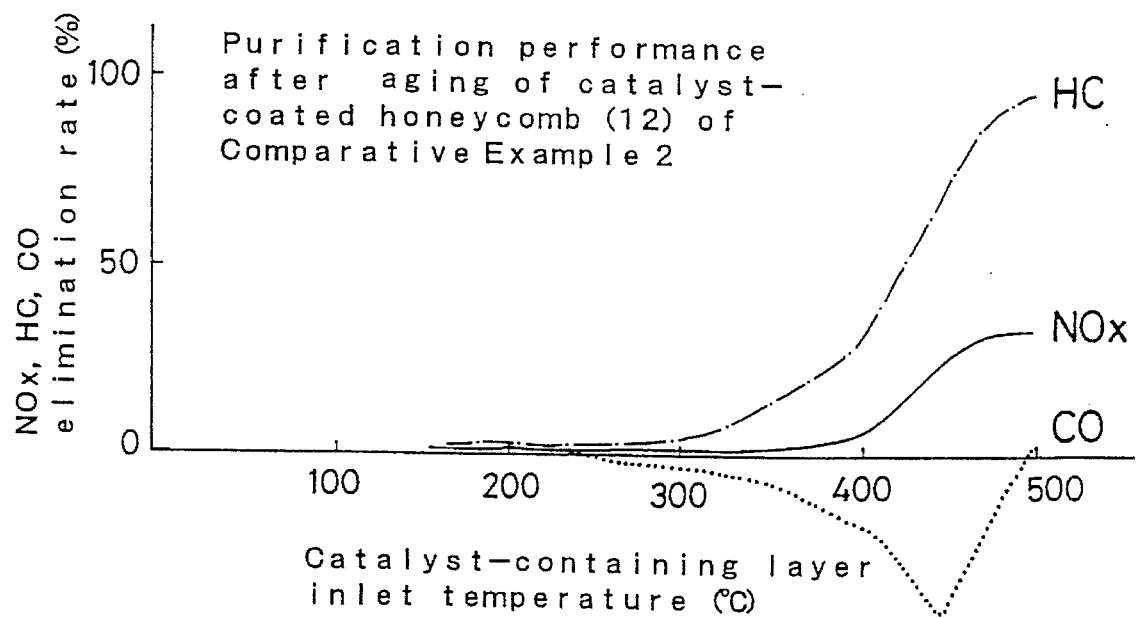
Fig. 4 Purification performance after aging of catalyst-coated honeycomb (12) of Comparative Example 2

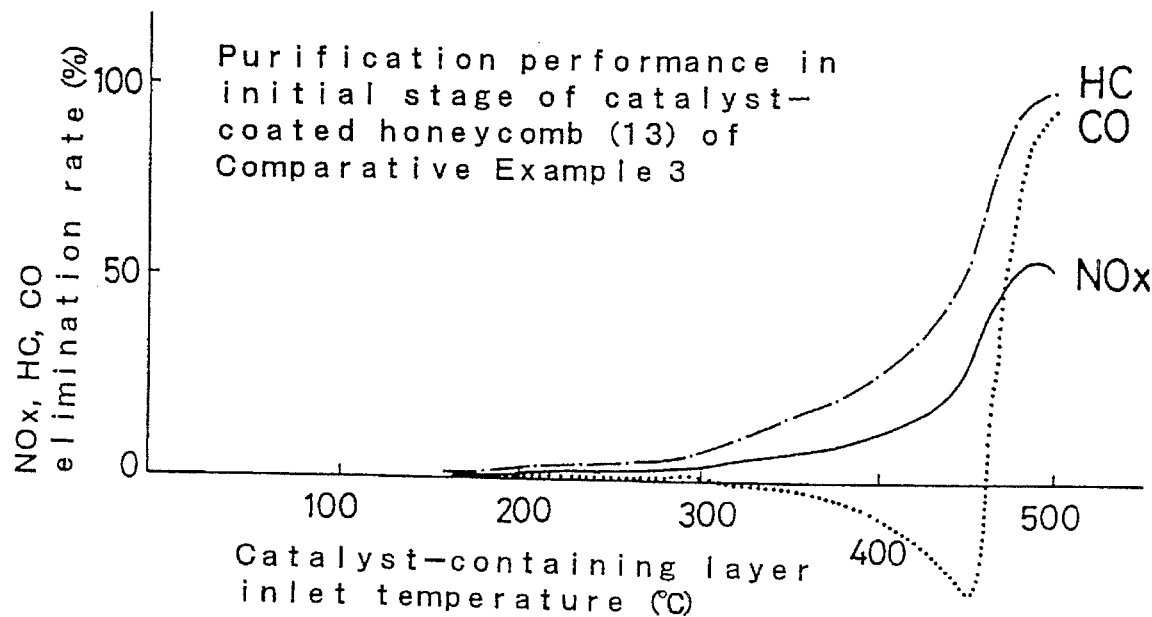
Fig. 5 Purification performance in initial stage of catalyst-coated honeycomb (13) of Comparative Example 3
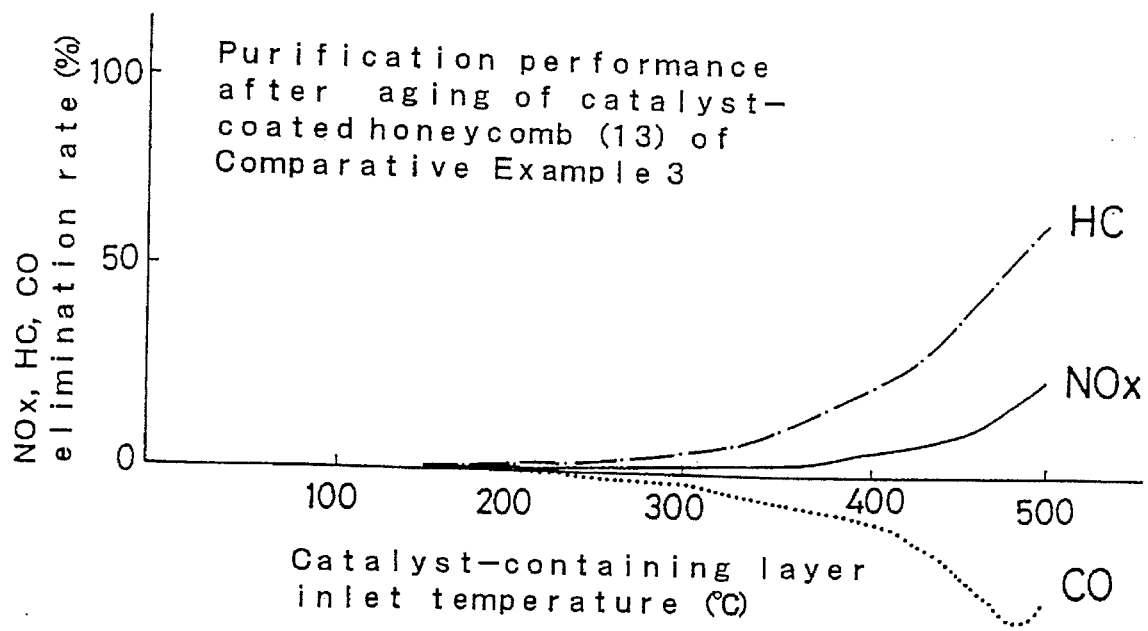
Fig. 6 Purification performance after aging of catalyst-coated honeycomb (13) of Comparative Example 3

CATALYST FOR PURIFYING EXHAUST GAS AND METHOD FOR PURIFYING EXHAUST GAS

BACKGROUND OF THE INVENTION

1. Field of the Invention

The present invention relates to a catalyst for purifying exhaust gases which are discharged from internal-combustion engines, boilers, gas turbines or the like and contain nitrogen oxides together with excess oxygen, and to a method for purifying the exhaust gases.

2. Description of the Prior Art

Nitrogen oxides (NOx) emitted from internal-combustion engines and the like may cause photochemical smog and acid rain, and elimination of NOx from their sources is urgently needed.

For elimination of NOx from exhaust gases from large-scale fixed sources such as electric power plants, heretofore, a selective catalytic reduction method has been used in which ammonia is added to the exhaust gas and a $TiO_2$—$V_2O_5$ catalyst is used. For eliminating NOx from exhaust gases from gasoline engines of automobiles and the like, on the other hand, a three-way catalyst (TWC) method has been used in which air-fuel ratio is controlled into the vicinity of the stoichiometric value (A/F=14.6) and a Pt—Rh/$Al_2O_3$ catalyst is used to thereby eliminate NOx simultaneously with carbon monoxide (CO) and hydrocarbons (HC).

Meanwhile, in order to prevent the earth's surface temperature from rising due to air pollution, it has become required in recent years to control emission of carbon dioxide (NOx) and to put into practical use a lean-burn gasoline engine in which gasoline is burned at a air-fuel ratio on the "leaner" side of the stoichiometric value. Exhaust gases from such lean-burn gasoline engines cannot be treated effectively with the three-way catalyst method.

In addition, diesel engines inherently are lean-burn engines, and elimination of NOx from their exhaust gases is also a problem of great urgency.

These lean-burn gasoline engines, diesel engines and other engines of the lean burn type are generically called lean-burn engines.

Exhaust gas from a lean-burn engine contains oxidants, oxygen ($O_2$) and NOx in excess of the stoichiometrically necessary quantity for complete oxidation of hydrocarbons (HC) (the term "hydrocarbons" herein refers to not only hydrocarbons in a narrow sense but also partially oxidized products thereof such as oxygenated hydrocarbons, for example, alcohols and ketones) which are products of incomplete oxidation of the fuel, CO and reducing components such as hydrogen ($H_2$), etc. Specifically, the exhaust gas may contain oxygen in such a high concentration as to give an air-fuel ratio A/F Of 17 or more. It has long been an unsolved problem to achieve selective elimination of NOx from exhaust gas in the presence of the excess oxygen without adding any special reducing agents such as ammonia.

For elimination of NOx from an exhaust gas which also contains excess oxygen, methods have been proposed in recent years in which NOx is selectively reduced in the presence of hydrocarbons by using a transition metal such as copper, cobalt, iron or the like supported through ion-exchange on an aluminosilicate [U.S. Pat. No. 4,297,328 and Japanese Pre-examination Patent Publication (KOKAI) No. 63-100919], a metalloaluminosilicate [Japanese Pre-examination Patent Publication (KOKAI) Nos. 3-127628 and 3-229620], a silicoaluminophosphate [Japanese Pre-examination Patent Publication (KOKAI) No. 1-112488] or the like as a catalyst. However, the transition-metal ion-exchange zeolite catalyst and the like just mentioned have a fatal drawback that they undergo irreversible deactivation in a short time when exposed to a water vapor-containing exhaust gas at a temperature of 650° to 700° C.; therefore, none of these catalysts have been successfully put to practical use.

On the other hand, metallosilicate catalysts in which a catalytically active component is not placed in ion-exchange sites but introduced into the skeleton of a crystalline silicate by isomorphous replacement have been proposed, for example, copper silicate catalysts [Japanese Pre-examination Patent Publication (KOKAI) No. 2-265649]; iron silicate, cobalt silicate or nickel silicate catalysts (A collection of papers for lectures at the 65th annual spring meeting of the Chemical Society of Japan, I, lecture No. 2F138), aluminorhodium silicate catalysts [Japanese Pre-examination Patent Publication (KOKAI) No. 5-76770] and the like. However, these catalysts are much lower than ion-exchange type catalysts in activity for selective reduction of nitrogen oxides in the practical space velocity range (GHSV≧10,000/hr).

Further methods proposed for eliminating NOx from an exhaust gas in the presence of excess oxygen employ a supported noble metal catalyst which is expected to exhibit high heat resistance. For example, a method of eliminating NOx from an exhaust gas containing excess oxygen by use of a catalyst comprised of iridium (Ir) supported on a porous inorganic oxide such as alumina ($Al_2O_3$) has been disclosed [Japanese Patent Publication (KOKOKU) Nos. 56-54173 and 57-13328 and U.S. Pat. No. 4,039,622 (1977)]. In the above literature, however, there is exemplified this type of catalyst showing catalytic performance only where oxygen concentration of exhaust gas is not more than 3%, or A/F is less than 17, and its NOx elimination performance is insufficient for the lean-burn engine exhaust gases of current concern which contain oxygen in such excess amounts that A/F is not less than 17. Thus, the greatest problem in the method of purifying exhaust gas by using a supported noble metal catalyst in an atmosphere containing excess oxygen is that due to the high oxidizing activity inherent to noble metal, hydrocarbons are preferentially oxidized by oxygen in the catalyst's actual service temperature range of 350° to 500° C., particularly in a high oxygen concentration region, so that selectivity in reduction of NOx is unsatisfactory.

SUMMARY OF THE INVENTION

The present invention has been made to overcome the problems in the prior art described above. Accordingly it is an object of the present invention to provide a highly active and durable catalyst for elimination of NOx and a method for efficiently purifying exhaust gas, suited to purifying exhaust gas from a lean-burn engine which contains oxygen in excess of the stoichiometric quantity.

The present inventors have found out that the above object can be attained by a catalyst for purifying exhaust gas comprising crystalline iridium silicate having a Si/Ir atomic ratio of 50 to 800 and a Si/Al atomic ratio of not less than 15, and have completed the present invention.

The crystalline iridium silicate catalyst according to the present invention exhibits excellent activity and selectivity when used for purification of, and specifically for eliminating NOx from, an exhaust gas which contains reducing components including hydrocarbons, oxygen in excess of the stoichiometric quantity necessary for completely oxidizing all of the reducing components, and nitrogen oxides. Besides, the catalyst is highly durable to hydrothermal aging. The method for purifying exhaust catalyst using the crystalline iridium silicate according to the present invention, when applied to purification of exhaust gases containing excess oxygen, can eliminate NOx, CO and HC with such a high efficiency as not attainable by the prior art, and the efficiency is retained stably for a long time. Thus, the inventive method is highly suited to practical use in exhaust-gas treatment.

BRIEF DESCRIPTION OF THE DRAWINGS

FIG. 1 is a diagram showing NOx, CO and HC elimination performance curves in the initial stage of the catalyst (1) produced in Example 1 of the present invention;

FIG. 2 is a diagram showing NOx, CO and HC elimination performance curves after aging of the catalyst (1) produced in Example 1 of the present invention;

FIG. 3 is a diagram showing NOx, CO and HC elimination performance curves in the initial stage of the catalyst (12) produced in Comparative Example 2 of the present invention;

FIG. 4 is a diagram showing NOx, CO and HC elimination performance curves after aging of the catalyst (12) produced in Comparative Example 2 of the present invention;

FIG. 5 is a diagram showing NOx, CO and HC elimination performance curves in the initial stage of the catalyst (13) produced in Comparative Example 3 of the present invention; and FIG. 6 is a diagram showing NOx, CO and HC elimination performance curves after aging of the catalyst (13) produced in Comparative Example 3 of the present invention.

DETAILED DESCRIPTION OF PREFERRED EMBODIMENTS

Catalyst

The catalyst for purifying exhaust gas according to the present invention comprises crystalline iridium silicate having a Si/Ir atomic ratio of 50 to 800, preferably 70 to 500, and a Si/Al atomic ratio of not less than 15, preferably 30 to 1,000.

There are no restrictions on crystal form of the crystalline iridium silicate. The crystal form may be any one that a high-silica metallosilicate can take stably, for example, MFI, MEL, MOR, FER, TON, MTT, MTW and beta types and the like, among which particularly preferred are MFI type and MEL type.

A preferable composition for the crystalline iridium silicate is represented, for example, by the following formula:

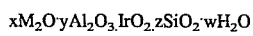

$$xM_2O \cdot yAl_2O_3 \cdot IrO_2 \cdot zSiO_2 \cdot wH_2O$$

wherein M stands for an alkali metal, and x, y, z and w are numbers which fulfill the relationships of $0<x/y\leq5.0$, $0<y\leq10$, $50\leq z\leq800$, $z/y\geq30$, and $0.01\leq w/z\leq0.5$.

In the formula (1) above, M stands for at least one alkali metal selected from the group consisting of Li, Na, K, Rb and Cs, among which preferred are Li and Na. $M_2O$ in the formula includes those $M_2O$ species resulting from a cation species $M^+$ introduced into ion replacement sites, through hydrothermal synthesis of the crystalline iridium silicate or by the subsequent ion exchange operation, in order to compensate for the valence difference of 1 between $Si^{4+}$ of the silicate skeleton and $Al^{3+}$ which have replaced $Si^{4+}$, and free alkali metal oxide species occluded in the silicate crystal at the other sites than the ion-exchange sites.

In the formula (1), the molar ratio x/y of the alkali metal oxide to $Al_2O_3$ is in the range of $0<x/y\leq5.0$, preferably $0<x/y\leq3.0$. In the x/y range, further, where x/y>1, free alkali metal oxide species $M_2O$ are present in the silicate crystal in addition to the alkali metal species present at the ion-exchange sites. If x/y>5.0, catalytic activity is lowered, which is undesirable. Besides, where alkali metal ions at the ion-exchange sites are replaced by $H^+$ through ion exchange, the condition of $0<x/y<1$ results.

In the formula (1), y represents the molar ratio of $Al_2O_3$ to $IrO_2$, and has a value in the range of $0<y\leq10$, preferably $0<y\leq5$. If y>10, the Ir content of the crystalline iridium silicate is excessively low as compared to the $Al_2O_3$ content, so that the intended effect of Ir addition cannot be obtained and the catalytic activity is lowered.

In the formula (1), z represents the molar ratio of $SiO_2$ to $IrO_2$, and has a value in the range of $50\leq z\leq800$, preferably $70\leq z\leq500$. Where $z\geq50$, in an X-ray crystal diffraction pattern of the crystalline iridium silicate, only the diffraction peaks due to the crystalline silicate structure are detected, other peaks relevant to free $IrO_2$ being not detected. If z<50, on the other hand, diffraction peaks relevant to free $IrO_2$ are detected overlapping with the peaks due to the crystalline silicate structure. In that case, the ratio of the free Ir to the Ir incorporated in the silicate skeleton is so high that coagulation or evaporation of $IrO_2$ proceeds in a high-temperature oxidizing atmosphere and, hence, the catalyst is lowered in thermal resistance. If z>800, on the other hand, Ir content is so low that the catalyst has a low activity.

Besides, z is also specified by the molar ratio z/y of $SiO_2$ to $Al_2O_3$, and the crystalline silicate must be a low-alumina high-silica metallosilicate wherein $z/y\geq30$, preferably $z/y\geq300$. If the $Al_2O_3$ content is so high that z/y<30, when the catalyst is used for purifying exhaust gas the selectivity for NOx reduction reduces and, further, dealumination proceeds gradually in a high-temperature water vapor-containing atmosphere, resulting in deterioration of the catalytic activity.

In the formula (1), w represents $H_2O$ arising from water of crystallization in the crystalline structure and from $H^+$ present in ion-exchange sites. The value of w is not specifically limited, and is normally in the range of $0.01\leq w/z\leq0.5$, preferably $0.05\leq w/z\leq0.2$.

Performance of the catalyst comprising the crystalline iridium silicate according to the present invention is extremely unique, as compared with those of metallosilicates of similar structure in which iridium has been replaced by other metallic element. That is, platinum silicate, rhodium silicate and palladium silicate having structure and composition similar to those of the crystalline iridium silicate have a high activity for only oxidation of HC and exhibit little selectivity for reduction of NOx. In contrast, the crystalline iridium silicate of the present invention has a restrained but sufficient ability for oxidation of CO and HC and a high ability for selective reduction of NOx.. Incidentally, base metal silicates such as silicate, iron silicate, copper silicate, cobalt silicate and the like are unsatisfactory in HC-oxidizing ability and extremely low in NOx-reducing activity itself.

Where $H^+$ and/or alkali metal ions in ion-exchange sites of the crystalline iridium silicate according to the present invention are replaced by ions of a transition metal such as Cu, Co, Fe, Ni and the like through ion exchange as taught by Japanese Pre-examination Patent Publication (KOKAI) No. 3-127628 and the like, the resulting catalyst is inferior in durability to hydrothermal environments and less favorable, as compared with the catalyst before ion exchange with the transition metal ion.

Preparation of catalyst

The crystalline iridium silicate which constitutes the catalyst of the present invention may be prepared according to known methods for synthesis of high-silica zeolite, except that an iridium source is present in the stage of preparing a gel. The applicable methods are classified generally into the following two methods.

In the first method (1), an iridium source, a silicon source and an alkali metal compound are mixed together, with or without adding an aluminum source and in the presence or absence of an appropriate template agent, to prepare a gel. The gel is placed under hydrothermal synthesizing conditions to crystallize, and the resulting crystal is calcined at a temperature of 300° to 900° C., preferably 500° to 700° C., to yield a crystalline iridium silicate. In the second method (2), an iridium source, a silicon source, an aluminum source and an alkali metal compound are mixed together, in the presence or absence of an appropriate template agent, to prepare a gel. The gel is placed under hydrothermal synthesizing conditions to crystallize, and the resulting crystal is calcined in an oxygen-containing atmosphere, to give an aluminum-containing crystalline iridium silicate, which is dealuminated while retaining its silicate skeleton structure, to yield a crystalline iridium silicate.

The template agent which may be used in the methods (1) and (2) above is suitably selected according to the crystal form of the iridium silicate to be synthesized. For synthesis of MFI type and MEL type iridium silicates, the template agent is preferably a quaternary ammonium hydroxide compound or a quaternary phosphonium hydroxide compound which is represented by the following formula:

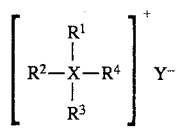

wherein X is a nitrogen or phosphorus atom, $R^1$, $R^2$, $R^3$ and $R^4$ may be the same or different and are each a hydrocarbon group such as alkyl groups such as methyl, ethyl, propyl, butyl, pentyl and hexyl, aralkyl groups such as benzyl, and the like, Y is an anion such as hydroxyl ion, chlorine ion, bromine ion, iodine ion or the like.

In the method (1), even where an aluminum source is not added as a specific independent material in hydrothermal synthesis of the gel, aluminum is normally present in the silicon source as an unavoidable impurity and mixed into the gel, to give the $Al_2O_3$ component in the composition formula for the iridium silicate produced.

In the method (2), a predetermined amount of an aluminum source is first added intentionally in a starting gel for the hydrothermal synthesis, to obtain a crystalline aluminoiridium silicate with a relatively high $Al_2O_3$ content (for example, $z/y<30$). The silicate obtained is dealuminated while retaining a silicate skeleton structure by an appropriate method, to give a desired crystalline iridium silicate having a low $Al_2O_3$ content ($z/y \geq 30$).

According to the method (2), it is possible to obtain crystalline iridium silicates with diverse skeleton structures which cannot be obtained according to the method (1).

The silicon source to be used in the methods (1) and (2) includes, for example, water glass, silica sol, silica gel, fumed silica and the like. The iridium source, on the other hand, includes various acids and their salts of iridium, such as iridium chloride ($IrCl_3$), chloroiridic acid ($H_2IrCl_6$), ammonium chloroiridate (($NH_4)_3IrCl_6$), ammonium chloroiridate (($NH_4)_2IrCl_5$), sodium chloroiridate ($Na_3IrCl_6$), sodium chloroiridate ($Na_2IrCl_6$), potassium chloroiridate ($K_3IrCl_6$), potassium chloroiridate ($K_2IrCl_6$), iridium sulfate ($Ir(SO_4)_2$), iridium nitrate ($Ir(NO_3)_4$) and the like, organometallic complexes such as $Ir_4(CO)_{12}$ and the like, hydroxides such as $Ir(OH)_4$ and the like, oxides such as $Ir_2O_3$, $IrO_2$ and the like, and so forth.

In the methods (1) and (2), the aluminum source which may be intentionally added as an independent material includes, for example, aluminum nitrate, sodium aluminate, alumina sol, boehmite, various transition aluminas such as γ, θ, δ- and η-aluminas, and so forth.

As the alkali metal compound, at least one compound is selected from the group consisting of ammonium hydroxide, and lithium, sodium, potassium, rubidium and cesium oxides.

The hydrothermal synthesis in the methods (1) and (2) above is carried out by maintaining the raw material gel under normal-pressure reflux conditions or under an autogeneous pressure in a hermetically sealed type autoclave, at 100° to 250° C. for 5 to 200 hours.

The reaction product is filtered, washed and dried, followed by calcining in an oxygen-containing atmosphere, preferably in air, at a temperature of 300° to 900° C., preferably 500° to 700° C., for 2 to 20 hours, preferably 4 to 10 hours.

Through the calcination step, the crystalline iridium silicate in the method (1) and the crystalline aluminoiridum silicate in the method (2) are each obtained as a proton type, an alkali (e.g., Na) ion type or a mixture thereof. A crystalline iridium silicate obtained as the alkali ion type by the above method may be transformed into the proton type by ordinary ion-exchange operation.

The dealumination treatment in the method (2) is suitably selected from mineral acid treatments, fluorine-containing compound treatments, high-temperature water vapor treatments and the like, taking into account the structural stability of the crystal form of the precursor aluminoiridium silicate so that the silicate skeleton is not broken by the treatment. To MFI-type, MEL-type and MOR-type precursors, for example, a method in which the precursor is maintained in an 8 to 10N aqueous hydrochloric acid solution at 90° to 100° C. for 1 to 10 hours and the like methods can be applied.

In the crystalline iridium silicate constituting the catalyst of the present invention, iridium is assumed to be present principally in the state of a substitute for Si in the silicate skeleton, but a part of iridium may be present as crystallites of iridium oxide $IrO_2$ on the outside of the skeleton. The $IrO_2$ crystallites, however, can hardly be detected by X-ray diffraction according to the power method.

Process for treating exhaust gas

The present invention relates also to a method for purifying an exhaust gas containing NOx, CO and HC discharged from a turbine, an internal-combustion engine or the like.

Namely, the present invention provides a method for purifying an exhaust gas which contains:

reducing components comprising hydrocarbons, oxygen in excess of the stoichiometric quantity necessary for completely oxidizing all of the reducing components, and nitrogen oxides, the method comprising bringing said exhaust gas into contact with an exhaust gas purification catalyst-containing layer, wherein the catalyst contained in the catalyst-containing layer comprises the above-described catalyst.

By the treatment described above, even in the presence of excess oxygen the NOx in an exhaust gas is reduced or decomposed into $N_2$ and $H_2O$ by reducing agents such as HC and the like, which, in reverse, are oxidized into $CO_2$ and $H_2O$.

Catalyst-containing layer

There are no particular restrictions on the form of the catalyst-containing layer in which the catalyst of the present invention is used in the above-described method for purifying exhaust gas.

For example, the catalyst-containing layer used in the purifying method may be constituted only of the catalyst. In this case, a method of filling a defined space with the catalyst, a method of forming the catalyst into a desired shape, or the like may normally be adopted. The shape of the formed catalyst is not particularly restricted, and may be, for example, spherical, cylindrical, honeycomb, spiral, granular or the like shape. The shape, size and the like can be suitably selected depending on the conditions under which the catalyst is to be used.

Alternatively, the catalyst-containing layer may comprise a structure wherein surfaces of a support substrate are coated with the catalyst. Particularly in the case of purifying exhaust gas from an automotive engine, it is impractical to place in the exhaust system a catalyst whose volume is disproportionally large, as compared to the displacement (stroke volume) of the engine. Besides, there is need to minimize the pressure drop arising from arranging the catalyst layer in the stream of exhaust gas, and to ensure that abrasion of the catalyst-containing layer due to vibration or the like is prevented even when used in an automobile running for a long time. In such instances, the catalyst-containing layer is preferably comprised of a purifying catalyst-coated structure comprising a support substrate which is formed essentially of a refractory material, preferably having a multiplicity of through-holes disposed in the direction of the exhaust gas stream, and the above-described catalyst with which a part of the surfaces of said support substrate, preferably at least the inside surfaces of said through-holes in said support substrate are coated. The refractory material for the support substrate includes, for example, ceramics such as α-alumina, mullite, cordierite and silicon carbide, metals such as austenitic and ferritic stainless steels, and so forth. The shape of the support substrate may be any of those conventionally used, for example, honeycombs, foams and the like. Among various support substrates applicable, preferred are honeycomb-shaped support substrate formed essentially of cordierite or stainless steel.

The support substrate is provided with a multiplicity of through-holes along the flow direction of exhaust gas. The number of the through-holes is preferably such that the through-hole rate (porosity), as viewed in cross section perpendicular to the flow direction, is ordinarily 60 to 90%, preferably 70 to 90%, that is, ordinarily 30 to 700 through-holes, preferably 200 to 600 through-holes per square inch (5.06 $cm^2$). The catalyst is applied at least to inside surfaces of the through-holes, and may also be applied to end faces and side surfaces of the support substrate.

As a method for coating the support substrate with the catalyst, a wash coating method and a sol gel method may be used, with or without using a binder.

The coating amount of the catalyst per unit volume of the support substrate is not particularly limited, and is preferably 20 to 200 g/L, more preferably 50 to 150 g/L. If the coating amount is excessively small, the purifying performance will be unsatisfactory, whereas if the coating amount is excessively large, clogging of the through-holes is liable to occur in application of the catalyst.

Wash coating of the refractory support substrate with the catalyst can be conducted, for example, by admixing a powdered catalyst with alumina sol as a binder and deionized water, kneading the resulting admixture to prepare a slurry, immersing the support substrate in the slurry, and removing excess slurry by air blow, followed by drying and calcining.

In recent years by-production of $N_2O$ gas, which leads to a higher earth surface temperature, as a partial reduction product of NOx has been a problem to be solved. According to the present invention, $N_2O$ is produced as a reduction product of NOx in an extremely reduced quantity.

Herein, NOx elimination rate and $N_2O$ formation rate are defined as below.

NOx conversion =

$$\frac{\left[\begin{array}{l} NOx \\ \text{concentration} \\ \text{at inlet of} \\ \text{catalyst-} \\ \text{containing} \\ \text{layer} \end{array}\right] - \left[\begin{array}{l} NOx \\ \text{concentration} \\ \text{at outlet of} \\ \text{catalyst-} \\ \text{containing} \\ \text{layer} \end{array}\right]}{\left[\begin{array}{l} NOx \text{ concentration at inlet of} \\ \text{catalyst-containing layer} \end{array}\right]} \times 100(\%)$$

$N_2O$ formation rate =

$$\frac{2 \times \left[\begin{array}{l} N_2O \text{ concentration at outlet} \\ \text{of catalyst-containing layer} \end{array}\right]}{\left[\begin{array}{l} NOx \text{ concentration at inlet of} \\ \text{catalyst-containing layer} \end{array}\right]} \times 100(\%)$$

In general, exhaust gas from a lean-burn engine contains several hundreds to several thousands of ppm of CO and several hundreds to several thousands of ppm of HC as well as 3 to 13% of $O_2$ and several hundreds to several thousands of ppm of NOx. The exhaust gas make contact with the above-described iridium silicate catalyst, thereby achieving a high NOx elimination rate over a wide range of catalyst-containing layer inlet temperature of 250° to 700° C. Where oxygen concentration is very high whereas CO and HC concentrations are too low, as in the case of diesel-engine exhaust gas, so that NOx cannot be eliminated satisfactorily by only the actions of the CO and HC contained in the exhaust gas, a minimum required quantity of a reducing agent may be externally added supplementally to the exhaust gas at an exhaust gas passage extending from a source of the exhaust gas to the catalyst-containing layer, whereby a sufficient NOx-eliminating efficiency can be attained without causing excessive lowering in fuel economy.

The reducing agents which can be added include, for example, CO, $C_2$–$C_{18}$ saturated or unsaturated hydrocarbons, their partially oxidized products (oxygenated hydrocarbons) and the like. Among these, which particularly preferred are $C_2$–$C_{10}$ unsaturated hydrocarbons such as ethylene, propylene, butene, hexene, octene, toluene, xylene, cumene and the like.

Besides, general-purpose fuels for internal combustion engine such as gasoline, kerosene, light oil, methanol, ethanol and the like themselves may also be used as the reducing agent to be supplementally added.

These hydrocarbons may be preliminarily evaporated and then added or may be added as a liquid by spraying, and is supplied to the catalyst-containing layer in the state of mixture with exhaust gas.

In the method of the present invention, the gas hourly space velocity GHSV of the exhaust gas flowing through the catalyst-containing layer is not particularly restricted, and is preferably 5,000 to 200,000/hr, preferably 10,000 to 100,000/hr.

If the GHSV is too low, a larger volume of catalyst is required for a given flow rate of gas, whereas if the GHSV is too high, a lower NOx elimination rate results.

EXAMPLES

The present invention will now be described more in detail below, with reference to working examples thereof and comparative examples. The present invention, however, is not limited to or by the working examples. In the following, % means % by weight. Catalysts in the comparative examples are marked with an asterisk (*).

Example 1

(1) Preparation of crystalline iridium silicate (I)

A 5-liter beaker was charged with 1,000 ml of deionized water, in which 8.2 g of chloroiridic acid ($H_2IrCl_6$, Ir content: 38.0%) was then dissolved (liquid A).

A 2-liter beaker was charged with 1,000 ml of deionized water, in which 30.9 g of 97% sodium hydroxide and 190 g of tetrapropylammonium bromide (TPAB) as a template agent were dissolved with stirring (liquid B).

Further, 29.7 g of 97% sulfuric acid ($H_2SO_4$) was diluted with 200 ml of deionized water (liquid C).

While the liquid A placed in the 5-liter beaker was being stirred, the liquid B was added dropwise thereto at a constant rate over a 30 minute period, and then the liquid C was added dropwise over 10 minutes. Further, 1,000 g of 30% colloidal silica (liquid D) was added dropwise into the beaker at a constant rate over 30 minutes, and the resulting gel was rendered to have a pH of 11.2 to 11.8.

The gel obtained was placed in a stainless-steel autoclave, and its cap was closed. While stirring the gel, internal temperature was raised to 170° C. over a 6 hour period, and stirring was continued at 170° C. under an autogeneous pressure for 100 hours. After natural cooling to room temperature, the content of the autoclave was taken out, filtered, washed with deionized water, and then dried at 110° C. for 16 hours, to give crystals. The crystals obtained were ground by mortar and pestle, and the ground powder was placed in a tray, which was placed in a muffle furnace. The temperature of the muffle furnace, with air as inside atmosphere, was raised from room temperature to 540° C. at a rate of 60° C./hr, and maintained at 540° C. for 4 hours. The thus treated powder was let cool and taken out, whereby 296 g of a crystalline iridium silicate powder (IS-01) was obtained. As a result of elemental analysis, the powder IS-01 was found to have a Si/Ir ratio of 323, a Si/Al ratio of 521 and, hence, a composition formula in terms of component oxides of $0.77Na_2O \cdot 0.31Al_2O_3 \cdot IrO_2 \cdot 323SiO_2 \cdot 35H_2O$. On X-ray diffraction by the powder method using $CuK\alpha$ radiation, the powder IS-01 gave the diffraction peaks shown in Table 1, whereby it was identified as having an MFI-type skeleton structure.

TABLE 1

| Lattice spacing d (unit: Å) | Peak intensity ratio $I/I_0$ |
| --- | --- |
| 11.21 | 100 |
| 10.00 | 75 |
| 6.01 | 25 |
| 3.86 | 96 |
| 3.82 | 68 |
| 3.72 | 45 |
| 3.66 | 15 |

(2) Preparation of crystalline iridium silicate catalyst-coated honeycomb (1)

To 30 g of the iridium silicate powder (IS-01) obtained in (1) above were added 2.0 g of 30% silica sol and 50 ml of deionized water, and the resulting mixture was kneaded by a ball mill for 16 hours, to give a slurry. A cylindrical core piece 2.52 cm in diameter and 6.35 cm in length which had been cut out from a commercial 400 cpsi cordierite honeycomb was immersed in the slurry, and then pulled up out of the slurry. Thereafter, the slurry-bearing core piece was treated with air blowing to remove excess slurry therefrom, dried and calcined at 500° C. for 30 minutes. In this manner, a catalyst-coated honeycomb (1) which was coated with IS-01 in a dried coating weight of 100 g per liter volume of honeycomb was obtained.

Example 2

Preparation of crystalline iridium silicate catalyst (II)

The procedure (1) of Example 1 above was repeated except that reagents to be used and/or amounts thereof were changed, to produce crystalline iridium silicate catalysts IS-02 to IS-06 differing in structure and/or composition. The kind and amount of the raw materials used as well as the structure and composition of the products are given in Table 2.

These iridium silicates were treated in the same manner as in the procedure (2) of Example 1 above, to give catalyst-coated honeycombs (2) to (6).

TABLE 2

| | | Preparation of crystalline iridium silicate ($xM_2O \cdot yAl_2O_3 \cdot IrO_2 \cdot zSiO_2 \cdot wH_2O$) | | | | | | | | | | |
| --- | --- | --- | --- | --- | --- | --- | --- | --- | --- | --- | --- | --- |
| | | Liquid B | | Liquid C | Liquid D | | Crystalline iridium silicate | | | | | |
| | Liquid A $H_2IrCl_6$ | 97% NaOH | Template agent | 97% $H_2SO_4$ | 30% $SiO_2$ sol | Crystal structure | Atomic ratio in product | | Composition of product | | | |
| | (gr) | (gr) | (gr) | (gr) | (gr) | | Si/Ir | Si/Al | x | y | z | w |
| Ex. 1 IS-01 | 8.2 | 38.6 | TPAB 190 | 29.9 | 1000 | MFI | 323 | 521 | 0.77 | 0.31 | 323 | 35 |
| Ex. 2 IS-02 | 8.5 | 37.7 | TBAB 230 | 30.7 | 1000 | MEL | 305 | 545 | 0.71 | 0.28 | 305 | 33 |

TABLE 2-continued

Preparation of crystalline iridium silicate ($xM_2O.yAl_2O_3.IrO_2.zSiO_2.wH_2O$)

|  | Liquid A $H_2IrCl_6$ (gr) | Liquid B 97% NaOH (gr) | Liquid B Template agent (gr) | Liquid C 97% $H_2SO_4$ (gr) | Liquid D 30% $SiO_2$ sol (gr) | Crystal structure | Atomic ratio in product Si/Ir | Atomic ratio in product Si/Al | Composition of product x | Composition of product y | Composition of product z | Composition of product w |
|---|---|---|---|---|---|---|---|---|---|---|---|---|
| IS-03 | 16.9 | 43.2 | TPAB 190 | 30.4 | 1000 | MFI | 168 | 323 | 0.65 | 0.26 | 168 | 19 |
| IS-04 | 25.3 | 48.4 | TPAB 190 | 31.7 | 1000 | MFI | 101 | 281 | 0.51 | 0.18 | 101 | 12 |
| IS-05 | 36.1 | 51.2 | TPAB 190 | 31.7 | 1000 | MFI | 71 | 323 | 0.33 | 0.11 | 71 | 4 |
| IS-06 | 5.6 | 34.4 | TPAB 190 | 31.0 | 1000 | MFI | 462 | 462 | 1.2 | 0.50 | 462 | 48 |

Notes:
TPAB = tetrapropylammonium bromide
TBAB = tetrabutylammonium bromide

Example 3

Preparation of crystalline iridium silicate catalyst (III) (with aluminum source added)

A 5-liter beaker was charged with 1,000 ml of deionized water, in which 8.2 g of chloroiridic acid ($H_2IrCl_6$, Ir content: 38.0%) was dissolved (liquid A).

A 2-liter beaker was charged with 1,000 ml of deionized water, in which 28.1 g of 97% sodium hydroxide (NaOH) and 15.3 g of sodium aluminate ($NaAlO_2$) were dissolved with stirring, and undissolved matter was filtered off. In the filtrate was dissolved 190 g of TPAB with stirring (liquid B).

Further, 18.8 g of 97% sulfuric acid ($H_2SO_4$) was diluted with 225 ml of deionized water (liquid C).

The liquids obtained above were treated in the same manner as in the procedure (1) of Example 1, whereby 288 g of a crystalline iridium silicate (IS-07) was obtained. Elemental analysis gave a Si/Ir ratio of 308, a Si/Al ratio of 39.5 and, hence, a composition formula in terms of oxides of:

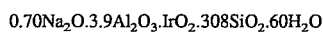

$$0.70Na_2O.3.9Al_2O_3.IrO_2.308SiO_2.60H_2O$$

Upon X-ray diffraction by the powder method using CuKα radiation, the silicate powder showed diffraction patterns given in Table 3, whereby it was defined as having an MFI-type skeleton structure.

TABLE 3

| Lattice spacing d (unit: Å) | Peak intensity ratio $I/I_0$ |
|---|---|
| 11.21 | 100 |
| 10.06 | 60 |

TABLE 3-continued

| Lattice spacing d (unit: Å) | Peak intensity ratio $I/I_0$ |
|---|---|
| 3.86 | 96 |
| 3.83 | 70 |
| 3.72 | 48 |
| 3.66 | 21 |

The procedure (1) of Example 1 was repeated except for using the iridium silicate powder (IS-07) in place of the iridium silicate (IS-01), whereby an iridium silicate catalyst-coated honeycomb (7) was obtained.

The above process was repeated except that the amounts of the reagents in the gel preparation stage were changed, to yield a catalyst-coated honeycomb (8) comprising a crystalline iridium silicate (IS-08) different in composition from the iridium silicate IS-07.

The raw materials used for preparation of the IS-07 and IS-08 and the composition of the products are set forth in Table 4.

TABLE 4

Preparation of crystalline iridium silicate ($xM_2O.yAl_2O_3.IrO_2.zSiO_2.wH_2O$)

|  |  | Liquid A $H_2IrCl_6$ (gr) | Liquid B 97% NaOH (gr) | Liquid B $NaAlO_2$ (gr) | Liquid B Template agent (gr) | Liquid C 97% $H_2SO_4$ (gr) | Liquid D 30% $SiO_2$ sol (gr) | Crystal structure | Atomic ratio in product Si/Ir | Atomic ratio in product Si/Al | Composition of product x | Composition of product y | Composition of product z | Composition of product w |
|---|---|---|---|---|---|---|---|---|---|---|---|---|---|---|
| Ex. 3 | IS-07 | 8.4 | 30.0 | 16.4 | TPAB 190 | 36.6 | 1000 | MFI | 308 | 39 | 0.70 | 3.9 | 308 | 60 |
|  | IS-08 | 8.4 | 30.0 | 8.2 | TPAB 190 | 30.2 | 1000 | MFI | 254 | 70 | 0.53 | 1.8 | 254 | 29 |

Notes:
TPAB = tetrapropylammonium bromide

Preparation of crystalline iridium silicate catalyst (IV) (with dealumination treatment)

A 1-liter round bottom flask was charged with 500 ml of aqueous 8N hydrochloric acid solution, to which was added 70 g of the aluminum-containing iridium silicate (IS-07) powder obtained in Example 3. The admixture was heated to 95° C. with stirring under a stream of nitrogen gas, and was maintained at that temperature for 5 hours. After natural cooling, the contents of the flask was filtered, and was washed with deionized water until the filtrate was found free of Cl ion. The washed product was dried, to give 66 g of a crystalline iridium silicate powder (IS-09) having a Si/Ir ratio of 300, a Si/Al ratio of 178 and, hence, a composition in terms of oxides of:

$$0.07Na_2O.0.95Al_2O_3.IrO_2.300SiO_2.58H_2O$$

and exhibiting an MFI structure on X-ray diffraction.

The iridium silicate powder IS-09 was treated in the same manner as in the procedure (2) of Example 1, to give a catalyst-coated honeycomb (9).

Comparative Example 1

Preparation of iridium silicate catalyst (II)

The procedure (1) of Example 1 was repeated except that the amounts of reagents were changed, whereby iridium silicate catalysts IS-10* and IS-11* with different compositions were produced. The amounts of the reagents used and the structure and composition of the products are set forth in Table 5.

These iridium silicates were treated in the same manner as in the procedure (2) of Example 1, to give iridium silicate catalyst-coated honeycombs (10) and (11). Where the amount of Ir put into a gel for hydrothermal synthesis is too large, as in the case of the iridium silicate IS-10*, Ir cannot be incorporated completely in the silicate skeleton, resulting in that peaks due to $IrO_2$ crystals are detected on X-ray diffractometory.

obtained with an ion-exchange rate in terms of $Cu^{2+}$ of 95%. The powder was treated in the same manner as in the procedure (2) of Example 1, to give a catalyst-coated honeycomb (13).

Comparative Example 4

Preparation of Ir ion-exchanged aluminosilicate catalyst

The aluminosilicate powder AS-01* used in Comparative Example 3, 100 g, was slurried in 2,000 ml of a 0.036M solution of Ir complex ($[IrCl(NH_3)_5]Cl_2$) in deionized water, and the slurry was stirred at room temperature for 16 hours. The slurry obtained was filtered, and the filter cake was washed, dried, and calcined at 500° C. for 2 hours, to give a 0.6% Ir ion-exchanged aluminosilicate powder (IrAS-01*) having an ion-exchange rate in terms of $Ir^{3+}$ of 22%. The powder Ir/AS-01* was used to coat a honeycomb to obtain a catalyst-coated honeycomb (14).

Comparative Example 5

Preparation of Ir-loaded alumina catalyst

A porcelain evaporating dish with a mantle heater was charged with 3 liters of deionized water, to which 100 g of γ-alumina powder (tradename: KHA-24, produced by Sumitomo Chemical Co., Ltd.) was added to form a slurry. With the slurry being stirred, 100 ml of a deionized water solution

TABLE 5

Preparation of crystalline iridium silicate ($xM_2O.yAl_2O_3.IrO_2.zSiO_2.wH_2O$)

| | | Liquid A $H_2IrCl_6$ | Liquid B 97% NaOH | Template agent | Liquid C 97% $H_2SO_4$ | Liquid D 30% $SiO_2$ sol | Crystalline iridium silicate | | | | | | |
|---|---|---|---|---|---|---|---|---|---|---|---|---|---|
| | | | | | | | Crystal struc- | Atomic ratio in product | | Composition of product | | | |
| | | (gr) | (gr) | (gr) | (gr) | (gr) | ture | Si/Ir | Si/Al | x | y | z | w |
| Comp. Ex. 1 | IS-10* | 63.5 | 54.0 | TPAB 190 | 30.3 | 1000 | MFI + $IrO_2$ | 43 | 269 | 1.3 | 0.08 | 43 | 2.5 |
| | IS-11* | 3.2 | 28.2 | TPAB 190 | 32.0 | 1000 | MFI | 832 | 378 | 3.6 | 1.1 | 832 | 92 |

Note:
TPAB = tetrapropylammonium bromide

Comparative Example 2

Preparation of Cu ion-exchanged iridium silicate catalyst

The aluminum-containing iridium silicate (IS-07) powder obtained in Example 3, 100 g, was slurried in 2,000 ml of a 0.03M copper acetate solution in deionized water, and the slurry was stirred at room temperature for 16 hours. The slurry obtained was filtered, and the filter cake was washed, dried, and calcined in air at 500° C. for 30 minutes, to yield a 1.85 wt. % Cu ion-exchanged iridium silicate powder (Cu/IS-07) with an ion-exchange rate in terms of $Cu^{2+}$ of 180%. The powder Cu/IS-07 was treated in the same manner as in the procedure (2) of Example 1, to give a catalyst-coated honeycomb (12).

Comparative Example 3

Preparation of Cu ion-exchanged aluminosilicate catalyst

According to the Rollmann-Valyocsik method (L. D. Rollmann and E. W. Valyocsik, Inorg. Synthesis, 22(1982), pp67–68), a H-type aluminosilicate (AS-01*) powder having a Si/Al ratio of 38 and an MFI structure was obtained.

In the same manner as in Comparative Example 2 except for using the powder AS-01* in place of IS-07, a 1.2% Cu ion-exchanged aluminosilicate powder (Cu/AS-01*) was of chloroiridic acid containing 0.7 g of Ir was added dropwise to the slurry. After completion of the dropping, the dish was gradually heated to evaporate off water, thereby drying and solidifying the slurry. The solid matter thus obtained was dried at 105° C., and ground to obtain a powder. The powder was calcined in air at 750° C. for 1 hour using a muffle furnace, to give a 0.7 wt.% Ir-loaded alumina powder ($Ir/Al_2O_3*$). The powder $Ir/Al_2O_3*$ was applied to a honeycomb to obtain a catalyst-coated honeycomb (15).

Comparative Example 6

Preparation of Ir-loaded Silicalite catalyst

According to the method disclosed in U.S. Pat. No. 4,061,724, Example 1, by R. W. Grose and E. M. Flanigen, a crystalline silicate of MFI structure, namely, Silicalite 1 (AS-02) powder was prepared. In the same manner as in Comparative Example 5 except for using 70 g of the AS-02 powder in place of the γ-alumina powder, a 0.7 wt. % Ir-loaded Silicalite (Ir/AS-02*) catalyst-coated honeycomb (16) was obtained.

Comparative Example 7

Preparation of Ir-loaded silica gel catalyst.

Comparative Example 5 was repeated except for using a silica gel powder (tradename: Wako-gel C-300, produced by Wakoh Seiyaku K. K.) in place of the γ-alumina powder, to obtain a 0.7 wt. % Ir-loaded silica gel (Ir/SiO$_2$*) catalyst-coated honeycomb (17).

Comparative Example 8

Preparation of non-Ir noble metal-containing silicate catalysts

Example 1 was repeated except that 9.0 g of chloroplatinic acid (H$_2$PtCl$_6$) containing 3.6 g of platinum (Pt) was used in place of chloroiridic acid, to obtain a platinum silicate (PS-01*) powder having a composition of the formula:

$$0.15Na_2O.0.49Al_2O_3.PtO_2.326SiO_2.27H_2O$$

and showing an MFI structure upon X-ray diffraction.

Similarly, rhodium nitrate (Rh(NO$_3$)$_3$) containing 1.73 g of rhodium (Rh) and palladium nitrate (Pd(NO$_3$)$_2$) containing 1.96 g of palladium (Pd) were each used to prepare a rhodium silicate (RS-02*) powder and a palladium silicate (PS-03*) powder, respectively. These powders both showed an MFI structure upon X-ray diffraction.

The three powders obtained as above were each processed in the same manner as in the procedure (2) of Example 1, to give respective catalyst-coated honeycombs (18), (19) and (20).

Comparative Example 9

Preparation of base metal silicate catalysts

In 1,000 ml of deionized water was dissolved 40.4 g of iron nitrate (Fe(NO$_3$)$_3$·9H$_2$O) containing 5.5 g of iron. Into the resulting solution, 190 g of TPAB was added and dissolved with stirring (liquid A). With the liquid A being stirred vigorously, a solution containing 30.0 g of 97%NaOH in 1,000 ml of deionized water was added dropwise to the liquid A over a 30 minute period, followed by adding 1,000 g of 30% colloidal silica dropwise over 30 minutes. The resulting gel was placed in an autoclave, and treated in the same manner as in the procedure (1) of Example 1, whereby 291 g of a crystalline iron silicate (BS-01*) powder having a composition formula:

$$0.08Na_2O.0.12Al_2O_3.Fe_2O_3.140SiO_2.50H_2O$$

was obtained. The powder BS-01* showed an MFI structure upon X-ray diffraction.

Similarly, a copper silicate (BS-02*) was prepared from Cu(NO$_3$)$_2$·H$_2$O, and a cobalt silicate (BS-03*) powder from Co(NO$_3$)$_2$·H$_2$O. These powders both showed an MFI structure upon X-ray diffraction.

The base metal silicate powders thus prepared were each processed in the same manner as in the procedure (2) of Example 1 to give respective catalyst-coated honeycombs (21), (22) and (23).

Comparative Example 10

Preparation of Pt-Rh loaded alumina (TWC) catalyst

A mixer was charged with 120 g of an activated alumina having a BET specific surface area of 150 m$^2$/g and an average particle diameter of 30 μm. While the alumina was being stirred, 30 ml of an aqueous amine solution of platinum hydroxide containing 2.0 g of platinum was added dropwise little by little so that the platinum hydroxide was uniformly dispersed and supported on the alumina. Subsequently, 15 ml of an aqueous rhodium nitrate solution containing 0.41 g of rhodium was added dropwise little by little so that rhodium was uniformly dispersed and supported on the alumina. Then, 10 ml of 25% acetic acid was added dropwise little by little, thereby preparing a 1.7%Pt-0.34%Rh loaded alumina powder with a Pt/Rh weight ratio of 5:1. The powder was used to coat a honeycomb in the same manner as in the procedure (2) of Example 1, to give a Pt-Rh/Al$_2$O$_3$* catalyst-coated honeycomb (24).

Performance Evaluation Example

Performance evaluation using gasoline lean-burn engine exhaust model gas

In the following, concentration of components of an exhaust model gas will be given in volumetric concentration, unless otherwise specified.

The catalyst-coated honeycombs (1) to (9) prepared in the above Examples of the present invention and the catalyst-coated honeycombs (10) to (24) prepared in the Comparative Examples were each subjected to the performance evaluation as follows. As the lean-burn engine exhaust model gas, a mixed gas consisting of 1,000 ppm of NO, 1,500 ppm of C$_3$H$_6$, 3,000 ppm of CO, 1,000 ppm of H$_2$, 3.5% of O$_2$, 10% of CO$_2$, 10% of H$_2$O and the balance of N$_2$ was prepared. While the mixed gas was supplied at a GHSV of 100,000/hr and the gas temperature at an inlet to a catalyst-containing layer was raised from 200° C. to 500° C. at a rate of 30° C./min, measurement was made of NOx, CO and HC elimination rates. Concentrations of NOx, CO, HC and N$_2$O gases were measured using a chemiluminescence-type NOx meter, a non-dispersion infrared-type CO meter, a FID-type HC meter and a non-dispersion infrared-type N$_2$O meter, respectively.

Subsequently, each of the catalyst-coated honeycombs was aged at 700° C. under a stream of a steam-air (10/90) mixed gas, and then subjected again to evaluation of NOx, CO and HC elimination performance under the model gas evaluation conditions above-described.

FIGS. 1 and 2 show NOx, CO and HC eliminating performance curves for the catalyst-coated honeycomb (1) produced in the Example of the present invention, in the initial stage and after aging, respectively. FIGS. 3 and 4, and FIGS. 5 and 6, show NOx, CO and HC eliminating performance curves for the catalyst-coated honeycombs (12) and (13) produced in Comparative Examples 2 and 3, in the initial stage and after aging, respectively.

As seen from the diagrams, conventional Cu ion-exchanged type metallosilicate catalyst-coated honeycombs (12) and (13) are relatively high in initial-stage activity for NOx elimination, but when they undergo 700° C. aging, their maximum NOx elimination rates are lowered and their maximum NOx elimination temperatures are shifted to the higher-temperature side. It is also seen that, in the temperature range in which NOx elimination rate rises with rising temperature, partial oxidation of HC occurs to make CO concentration to be higher at the outlet of the catalyst-containing layer than at the inlet of the layer (this corresponds to the negative CO conversion seen in the diagrams).

In contrast to the above, the catalyst-coated honeycomb (1) produced in Example of the present invention were little influenced by the aging with respect to the maximum NOx elimination rate and maximum NOx elimination temperature, which indicates highly stable catalyst performance. Furthermore, with the catalyst-coated honeycomb (1) after aged as well as in the fresh state, generation of CO was not observed in the temperature region in which NOx elimination rate increases with temperature, as evidenced by almost simultaneous rises in CO elimination rate and HC elimination rate.

Table 6 shows in comparison the values of the maximum NOx elimination rate and maximum NOx elimination temperature, before and after aging, for the catalyst-coated honeycombs (1) to (9) produced in the Examples of the present invention and the catalyst-coated honeycombs (10) to (11) and (14) to (23) produced in the Comparative Examples.

In Comparative Example 9, the honeycombs (21), (22), and (23) coated with a silicate of a base metal such as iron, copper or cobalt were tested. These catalyst-coated honeycombs all have extremely low NOx eliminating activity of 10% or less, even in the initial stage.

In Comparative Example 10, a conventional platinum-rhodium three-way catalyst was tested. When the catalyst was brought into contact with the lean-burn engine exhaust model gas, it showed the maximum NOx conversion of 42% at 240° C., but it also produced $N_2O$, a gas said to raise the earth's surface temperature, in a formation rate as high as 30%. That is, NOx elimination rate was only 12%.

What is claimed is:

1. A catalyst for purifying exhaust gas comprising crystalline iridium silicate having a Si/Ir atomic ratio of 50 to 800 and a Si/Al atomic ratio of not less than 15.

TABLE 6

| | | Catalyst-coated honeycomb | $No_x$ elimination rate | | | |
|---|---|---|---|---|---|---|
| | | | fresh | | after aging | |
| | Catalyst | | Cmax (%) | Tmax (°C.) | Cmax (%) | Tmax (°C.) |
| Example 1 | IS-01 | (1) | 50 | 450 | 55 | 450 |
| Example 2 | IS-02 | (2) | 45 | 450 | 44 | 500 |
| | IS-03 | (3) | 57 | 470 | 55 | 500 |
| | IS-04 | (4) | 60 | 480 | 54 | 500 |
| | IS-05 | (5) | 47 | 430 | 49 | 450 |
| | IS-06 | (6) | 44 | 500 | 40 | 500 |
| Example 3 | IS-07 | (7) | 40 | 450 | 45 | 450 |
| | IS-08 | (8) | 41 | 450 | 46 | 450 |
| Example 4 | IS-09 | (9) | 56 | 440 | 64 | 430 |
| Comp. Ex. 1 | IS-10 * | (10) | 18 | 420 | 34 | 460 |
| | IS-11 * | (11) | 11 | 500 | 1 | 500 |
| Comp. Ex. 4 | Ir/AS-01 * | (14) | 18 | 400 | 22 | 450 |
| Comp. Ex. 5 | Ir/Al$_2$O$_3$ * | (15) | 24 | 500 | 33 | 500 |
| Comp. Ex. 6 | Ir/AS-02 * | (16) | 1 | 500 | 1 | 500 |
| Comp. Ex. 7 | Ir/SiO$_2$ . | (17) | 30 | 480 | 35 | 500 |
| Comp. Ex. 8 | PS-01 * | (18) | 8 | 350 | — | — |
| | PS-02 * | (19) | 3 | 400 | — | — |
| | PS-03 * | (20) | 10 | 280 | — | — |
| Comp. Ex. 9 | BS-01 * | (21) | 2 | 400 | — | — |
| | BS-02 * | (22) | 1 | 500 | — | — |
| | BS-03 * | (23) | 1 | 500 | — | — |

As is clear from Table 6, the catalyst-coated honeycombs (1) to (9) produced in the Examples of the present invention showed, in the initial stage, high NOx elimination performance as evidenced by the maximum NOx elimination rates of at least 40% in the temperature range of 430° to 500° C., and they retained the high performance even after aged at 700° C. In contrast, the catalyst-coated honeycombs (10) and (11) produced in Comparative Example 1, wherein an excess of iridium had been added to the gel for hydrothermal synthesis with the result of imperfect crystallization and formation of free $IrO_2$ or wherein the content of iridium in iridium silicate was excessively low, both showed only unsatisfactory NOx eliminating performance. In Comparative Examples 4, 5, 6 and 7, the catalyst-coated honeycomb (14) obtained by replacing cations in the aluminosilicate with $Ir^{3+}$ ions through ion-exchange and the catalyst-coated honeycombs (15), (16) and (17) comprising Ir supported on γ-alumina, Silicalite or silica gel, were tested and were all found to be unsatisfactory in activity in the initial stage and activity after aging.

Comparative Example 8 demonstrates the honeycombs (18), (19) and (20) which are coated with a non-Ir metal silicate catalyst having a skeleton structure similar to that of the iridium silicate of the present invention. These catalyst-coated honeycombs all have low selectivity for NOx reduction.

2. The catalyst of claim 1, wherein the Si/Ir atomic ratio is 70 to 500 and the Si/Al atomic ratio of 30 to 1,000.

3. The catalyst of claim 1, wherein said crystalline iridium silicate has the composition represented by the formula:

$$xM_2O \cdot yAl_2O_3 \cdot IrO_2 \cdot zSiO_2 \cdot wH_2O$$

wherein M stands for an alkali metal, and x, y, z and w are numbers which fulfill the relationships of $0<x/y\leq5.0$, $0<y\leq10$, $50\leq z\leq800$, $z/y\geq30$, and $0.01\leq w/z\leq0.5$.

4. The catalyst of claim 3, wherein in the above formula, x, y, z and w are numbers which fulfill the relationships of $0<x/y\leq3.0$, $0<y\leq5$, $70\leq z\leq500$, $z/y\geq300$, and $0.05\leq w/z\leq0.2$.

5. A catalyst-coated structure for purifying exhaust gas, comprising a support substrate formed essentially of a refractory material, and a catalyst a defined in claim 1 with which at least a part of the surfaces of said support substrate is coated.

6. The structure of claim 5, wherein the coating weight of said catalyst per unit volume of said support substrate is 20 g/L to 200 g/L.

* * * * *